US012792887B2

(12) United States Patent
Lee et al.

(10) Patent No.: US 12,792,887 B2
(45) Date of Patent: Nov. 10, 2026

(54) FINE-TUNING A LANGUAGE MODEL TO REDUCE REPRESENTATIONS OF STRUCTURED DATA

(71) Applicant: ADOBE INC., San Jose, CA (US)

(72) Inventors: Younghun Lee, West Lafayette, IN (US); Xiang Chen, Palo Alto, CA (US); Tong Yu, Fremont, CA (US); Sungchul Kim, San Jose, CA (US); Ryan A. Rossi, Santa Clara, CA (US)

(73) Assignee: ADOBE INC., San Jose, CA (US)

( * ) Notice: Subject to any disclaimer, the term of this patent is extended or adjusted under 35 U.S.C. 154(b) by 475 days.

(21) Appl. No.: 18/406,878

(22) Filed: Jan. 8, 2024

(65) Prior Publication Data

US 2025/0225373 A1 Jul. 10, 2025

(51) Int. Cl.
*G06N 3/0455* (2023.01)

(52) U.S. Cl.
CPC .................................. *G06N 3/0455* (2023.01)

(58) Field of Classification Search
None
See application file for complete search history.

(56) References Cited

U.S. PATENT DOCUMENTS 10,210,245 B2 * 2/2019 Zou ....................... G06F 16/322
10,437,868 B2 * 10/2019 Trifunovic ............ G06F 16/334
11,003,865 B1 * 5/2021 Lee ......................... G06F 40/56
11,232,358 B1 * 1/2022 Ramezani .............. G06N 3/084
11,361,571 B1 * 6/2022 Fusco ................... G06F 40/166
11,514,363 B2 * 11/2022 Lewis .................... G06N 3/044
11,526,667 B2 * 12/2022 Kantor .................... G06F 40/30
12,045,272 B2 * 7/2024 Mahapatra .......... G06F 16/3329
12,437,016 B2 * 10/2025 Park .................... G06F 16/9538
12,591,745 B2 * 3/2026 Korbak ................... G06F 40/30
2017/0017899 A1 * 1/2017 Maor .................... G06F 16/285
2021/0350076 A1 * 11/2021 Kantor .................. G06N 20/00
2023/0274093 A1 * 8/2023 Kumar ..................... G06N 5/04
704/9

OTHER PUBLICATIONS

Chen, W., et al., "HybridQA: A dataset of multi-hop question answering over tabular and textual data", Association for Computational Linguistics, Nov. 2020, pp. 1026-1036.

(Continued)

*Primary Examiner* — Maikhanh Nguyen
(74) *Attorney, Agent, or Firm* — Shook, Hardy & Bacon L.L.P.

(57) ABSTRACT

Methods and systems are provided for using a fine-tuned language model to reduce representations of structured data. In embodiments described herein, training data is accessed that includes structured data, a set of queries for the structured data, and each portion of the structured data that is relevant to each query of the set of queries. A language model is fine-tuned to maximize a cumulative reward based on the training data. The cumulative reward includes a reward for determining a correct portion of the structured data, a first penalty for failing to determine the correct portion of the structured data, and a second penalty for determining an incorrect portion of the structured data. The fine-tuned language model is then output.

13 Claims, 7 Drawing Sheets

(56) References Cited

OTHER PUBLICATIONS

Chung, H, W., et al., "Scaling Instruction-Finetuned Language Models", arXiv:2210.11416v5 [cs.LG] Dec. 6, 2022, pp. 1-54 (2022).
Deng, M., et al., "Rlprompt: Optimizing discrete text prompts with reinforcement learning", Proceedings of the 2022 Conference on Empirical Methods in Natural Language Processing, Dec. 2022, pp. 3369-3391.
Hegselmann, S., et al., "Tabllm: Few-shot classification of tabular data with large language models", Proceedings of the 26th International Conference on Artificial Intelligence and Statistics, PMLR: vol. 206, 2023, pp. 5549-5581.
Jiang, J., et al., "StructGPT: A general framework for large language model to reason over structured data", Proceedings of the 2023 Conference on Empirical Methods in Natural Language Processing, Dec. 2023, pp. 9237-9251.
Kojima, T., et al., "Large Language Models are Zero-Shot Reasoners", arXivpreprintarXiv:2205.11916, pp. 1-42 (2022).
Li, X., et al., "Chain of knowledge: A framework for grounding large language models with structured knowledge bases", arXivpreprintarXiv:2305.13269, 2023, pp. 1-22.
Li, Z., et al., "Guiding large language models via directional stimulus prompting", 37th Conference on Neural Information Processing Systems, 2023, pp. 1-27.
Liu, L. F. et al., "Lost in the middle: How language models use long contexts", arXivpreprintarXiv:2307.03172, 2023, pp. 1-18.
Liu, Y., et al., "ROBERTa: A Robustly Optimized BERT Pretraining Approach", arXiv:1907.11692, pp. 1-13 (Jul. 26, J019).
Lu, P. et al., "Dynamic Prompt Learning via Policy Gradient for Semi-structured Mathematical Reasoning", arXivpreprintarXiv:2209.14610, 2022, pp. 1-26.
OpenAI, "Gpt-4 technical report", arXivpreprintarXiv:2303.08774, 2023, pp. 1-100.
Pasupat, P., et al., "Compositional semantic parsing on semi-structured tables", arXivpreprintarXiv:1508.00305, 2015, pp. 1-11.
Prasad, A., et al., "GRIPS: Gradient-free, Edit-based Instruction Search for Prompting Large Language Models", arXivpreprintarXiv:2203.07281, 2022, pp. 1-20.
Ramamurthy, R., et al., "Is Reinforcement Learning (Not) for Natural Language Processing: Benchmarks, Baselines, and Building Blocks for Natural Language Policy Optimization", arXivpreprintarXiv:2210.01241, 2022, pp. 1-61.
Schulman, J. et al., "Proximal Policy Optimization Algorithms", arXivpreprintarXiv:1707.06347, pp. 1-12 (Aug. 28, 2017).
Shi, T., et al., "On the Potential of Lexico-logical Alignments for Semantic Parsing to SQL Queries", arXivpreprintarXiv:2010.11246, Nov. 2020, pp. 1849-1864.
Shin, T., et al., "AutoPrompt: Eliciting Knowledge from Language Models with Automatically Generated Prompts", Proceedings of the 2020 Conference on Empirical Methods in Natural Language Processing, Nov. 2020, pp. 4222-4235.
Tan, C. et al., "Make a Choice! Knowledge Base Question Answering with In-Context Learning", arXivpreprintarXiv:2305.13972, 2023, pp. 1-9.
Wang, X., et al., "Self-consistency improves chain of thought reasoning in language models", arXivpreprintarXiv:2203.11171, 2022, pp. 1-24.
Wei, J., et al., "Chain of thought prompting elicits reasoning in large language models", arXivpreprintarXiv:2201.11903, 2022, pp. 1-43.
Yasunaga, M., et al., "Qa-gnn: Reasoning with language models and knowledge graphs for question answering," In Proceedings of the 18th Meeting of the North American Association for Computational Linguistics (NAACL), pp. 535-546 (2021).
Ye, Y., et al., "Large language models are versatile decomposers: Decompose evidence and questions for table-based reasoning", SIGIR '23: The 46th International ACM SIGIR Conference on Research and Development in Information Retrieval, Jul. 2023, pp. 1-16.
Yu, W., et al., "Generate rather than retrieve: Large language models are strong context generators", arXivpreprintarXiv:2209.10063, 2022, pp. 1-27.
Ziegler, D. M., et al., "Fine-tuning language models from human preferences", arXivpreprintarXiv:1909.08593, 2019, pp. 1-26.

* cited by examiner

FINE-TUNING A LANGUAGE MODEL TO REDUCE REPRESENTATIONS OF STRUCTURED DATA

BACKGROUND

Large language models ("LLMs") are utilized in understanding language for downstream tasks, such as question answering. However, LLMs often cannot integrate structured data into their prompts in order to output a response based on the structured data. Structured data, such as tables, knowledge graphs and databases, often includes a significant number of entities and relations. As well, the structural dependencies among entities and instances of structured data are distinct from natural language input when the structured data is encoded and represented as vectors. As a result, not only will structured data often exceed the maximum token limit for input context of an LLM, the complex nature of the structured data will often cause the LLM to provide errors even when the input context is within the maximum token limit of the LLM.

SUMMARY

Various aspects of the technology described herein are generally directed to systems, methods, and computer storage media for, among other things, using a fine-tuned language model to reduce representations of structured data. In this regard, embodiments described herein facilitate using a fine-tuned language model to reduce representations of structured data in order to reduce the contextual input provided to a pre-trained language model to generate a response to a prompt. For example, a training data set is used to fine-tune a pre-trained language model to determine relevant portions of structured data based on corresponding queries. In some implementations, the structured data corresponds to a table, and a first pre-trained language model is fine-tuned to determine relevant columns of a table, while a second pre-trained language model is fine-tuned to determine relevant rows of the table based on the remaining columns of the table. The fine-tuned language models can then be further fine-tuned to maximize the cumulative reward of an on-policy learning framework that can include a positive reward for selecting the correct portions of the structured data, a first negative reward (e.g., a penalty) for incorrect selection of portions of the structured data, and/or a second negative reward for failure to select the correct portions of the structured data. Following fine-tuning, when a user inputs a query along with input context corresponding to structured data, such as an unseen table, to prompt a pre-trained language model (e.g., an LLM, such as ChatGPT) to generate a response, the fine-tuned language model(s) can reduce the input context by determining the relevant portions of the structured data based on the query. The query and a representation of the relevant portions of the structured data can then be provided in a prompt to the pre-trained language model (e.g., the LLM) to generate a response to the query based on the reduced input context.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
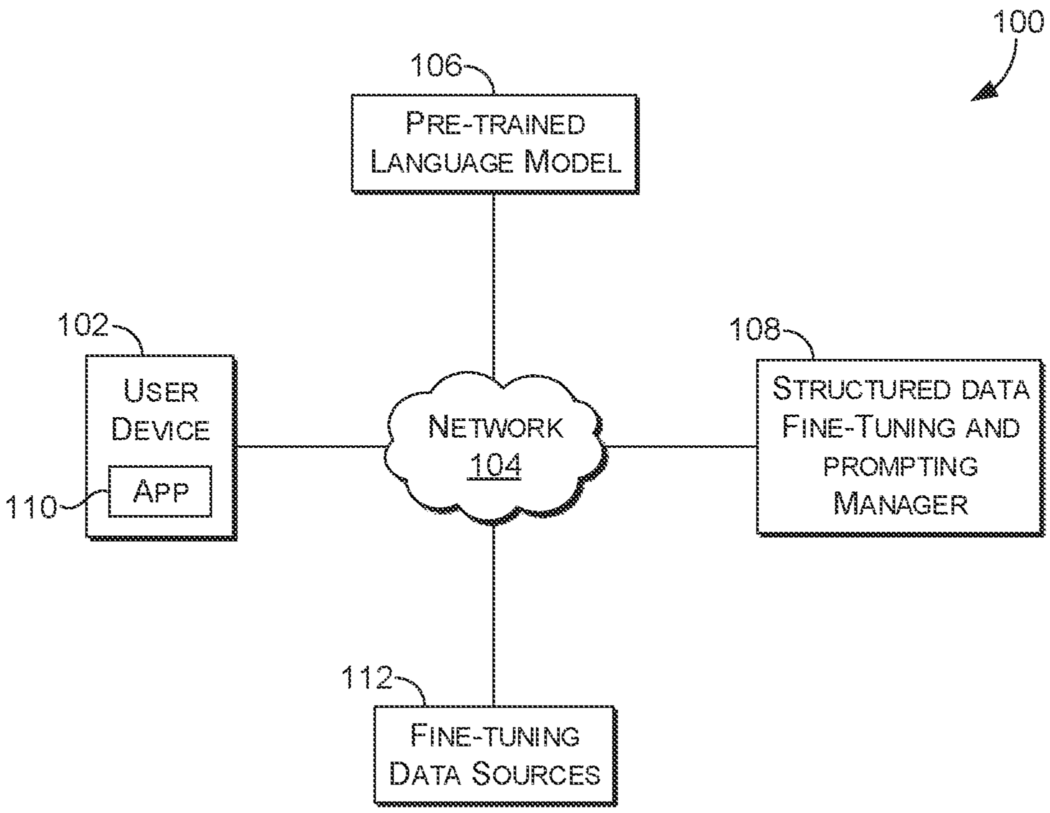
FIG. 1 depicts a diagram of an environment in which one or more embodiments of the present disclosure can be practiced, in accordance with various embodiments of the present disclosure.

Various terms are used throughout the description of embodiments provided herein. A brief overview of such terms and phrases is provided here for ease of understanding, but more details of these terms and phrases is provided throughout.

A "language model" generally refers to an AI system trained to understand and generate human-readable text. A "pre-trained language model" refers to a language model that is trained on a large and diverse dataset to learn general language patterns and contexts. Examples of pre-trained language models include generative-pre-trained transformer (GPT) models, text-to-text transfer transformer (T5) models, bidirectional encoder representations from transformers ("BERT") models, such as sentence-BERT (SBERT) models, robustly optimized BERT approach (RoBERTa) models, and/or the like, fine-tuned language net (FLAN) models, such as FLAN-T5 and/or the like, pathways language model (PaLM), XLNet and/or the like. A "sequence-to-sequence (seq2seq)" language model is a type of neural network architecture designed for tasks involving sequences, where an input sequence is transformed into an output sequence. "Fine-tuning" refers to the process of adjusting a pre-trained language model based on specific data to improve the performance of the model for a specific task, domain, and/or application related to the specific data.

A "prompt" for a language model refers to a specific input or instruction given to the language model to generate a desired response. For example, a prompt can include a query, such as a question for the language model to answer, context for the query, such as a source of information where the answer can be determined from, and/or additional instructions for the language model, such as instructions to provide the answer in a specific format. "Context" for the prompt refers to the information that precedes and/or is provided with the prompt that helps guide the language model's understanding in providing a response.

A "Markov Decision Process (MDP)" is a mathematical framework used for modeling decision-making problems in situations where outcomes are partly random and partly under the control of a decision maker. The key components of an MDP include: states (S), which refers to a set of possible situations or conditions the system can be in; actions (A) which refers to a set of possible moves or decisions that the decision maker can take; transition probabilities (P), which refers to probabilities associated with moving from one state to another after taking a particular action; rewards (R) which refers to numerical values associated with the outcomes of state-action pairs, indicating the immediate benefit or cost; and policy (7) which refers to a strategy or a mapping from states to actions, defining the decision maker's behavior. The MDP framework can be used to solve problems in which decisions are made sequentially over time where the goal is to find an optimal policy that maximizes the expected cumulative reward over the long term. Reinforcement learning can utilize an MDP framework for modeling and solving decision-making problems.

"Reinforcement learning (RL)" refers to a type of machine learning technique where an agent learns to make decisions by interacting with an environment. The agent receives feedback in the form of rewards or penalties to learn optimal behavior or strategies. "Policy network training" refers to a RL approach that involves training a neural network, known as the policy network, to learn a policy. The goal of RL and/or policy network training is for the agent to learn a policy (e.g., a mapping from states to actions) that maximizes the cumulative reward. Similar to the MDP framework, an "agent" refers to an entity that makes decisions (e.g., actions) within an environment. An "environment" refers to the external system in which the agent interacts and receives feedback. A "state" refers to a representation of the current configuration of the environment. An "action" refers to the decision made by the agent at a particular state. A "reward" refers to the numerical feedback received by the agent after taking an action in a certain state.

An "on-policy learning framework" refers to a type of RL where the agent learns from the experiences it gathers by interacting with the environment using its current policy. In on-policy RL, the agent collects data by following its current policy and then uses the data to update and improve the policy. In this regard, the data used for learning in on-policy learning comes from the same policy that is being updated.

"Proximal Policy Optimization (PPO)" refers to an algorithm used in RL to optimize policies by determining an improved policy while avoiding large policy updates that could lead to instability during training. PPO introduces a "proximal" constraint on policy updates, limiting the change in policy to prevent drastic shifts to help maintain stability and allow for more reliable learning.

"Kullback-Leibler (KL) Divergence" is a measure used to quantify the difference between two probability distributions. In policy optimization algorithms of RL, such as PPO, KL Divergence is used to regulate the size of policy updates during training in order to prevent overly large policy changes that could lead to instability in the learning process. During training, the current policy is updated to improve performance. KL Divergence is used as a constraint to ensure that the updated policy does not deviate too much from the current policy to help maintain stability in the learning process and prevent drastic changes that can negatively impact the training process. In this regard, KL Divergence acts as a regularization term that controls how much the new policy can differ from the existing policy during the training of an RL model.

A "gold label" refers to the correct or reference label assigned to a piece of data, typically provided by human annotators, representing the ground truth or the correct answer for a given example in a supervised learning setting. "Log likelihood" refers to a statistical measure of the probability of observed data based on parameter values of a model. In this regard, log likelihood refers to the logarithm of the likelihood function, which is the probability of observing given data under a statistical model.

"Structured data" refers to organized and formatted information that is identifiable and searchable. Structured data is typically stored in databases and/or tables with a defined structure to allow for analysis and information retrieval operations. Examples of structured data include tables and/or spreadsheets that include information organized in rows and columns, databases, such as relational databases (e.g., that use structure query language (SQL) for querying), knowledge graphs, and/or the like. A "structured data file" refers to a file that includes structured data.

"Trigger-generating" refers to causing or initiating the generation of an output or response in response to input in order to automate processes in software.

Overview

LLMs are utilized in understanding language for downstream tasks, such as question answering. However, LLMs often cannot integrate structured data into their prompts in order to output a response based on the structured data. Structured data, such as tables, knowledge graphs and databases, often includes a significant number of entities and relations. As well, the structural dependencies among entities and instances of structured data are distinct from natural language input when the structured data is encoded and represented as vectors. As a result, not only will structured data often exceed the maximum token limit for input context of an LLM, the complex nature of the structured data will often cause the LLM to provide errors even when the input context is within the maximum token limit of the LLM.

Currently, in order to prompt a pre-trained language model to generate a response based on structured data, the entirety of the structured data must be provided as input context to the pre-trained language model. For example, in an existing approach, a pre-trained language model that is trained on general language patterns and contexts, such as GPT, is first prompted to select the relevant portion of the structured data. The pre-trained language model is then prompted to select the answer from the relevant portions of the structured data. However, due to the complexities of structured data as opposed to natural language, the pre-trained language model that is trained on general language patterns and contexts will often output errors caused by a selection error during the initial selection of relevant evidence even when the input context includes structured data well below the maximum token limit of the pre-trained language model.

Accordingly, unnecessary computing resources are utilized by language models to provide responses based on structured data in prior implementations. For example, computing and network resources are unnecessarily consumed to manually edit the structured data in order to reduce errors from a language model caused by the structured data and/or provide multiple prompts to costly language models, such as GPT4, to reduce the structured data where the costly language models will still often output errors based on the complexities of the structured data. For instance, computer input/output operations are unnecessarily increased to manually edit the structured data and/or provided multiple prompts to the language model. Further, each of the multiple prompts and manual editing tasks increases computational costs involved with computing a response from the language model when the input context includes structured data. Further, when the information related to manually editing the structured data and/or providing the multiple prompts to the language model is located in a disk array, there is unnecessary wear placed on the read/write head of the disk of the disk array each time the information is accessed. Even further, the processing of operations to manually edit the structured data and/or provide the multiple prompts to the language model decreases the throughput for a network, increases the network latency, and increases packet generation costs when the information is located over a network.

As such, embodiments of the present disclosure are directed to using a fine-tuned language model to reduce representations of structured data in an efficient and effective manner. In this regard, a reduced representation of the structured data generated by a fine-tuned language model can be efficiently and effectively utilized to reduce the input context of the structured data provided to a pre-trained language model.

Generally, and at a high level, embodiments described herein facilitate using a fine-tuned language model to reduce representations of structured data in order to reduce the contextual input provided to a pre-trained language model to generate a response to a prompt. For example, a training data set is used to fine-tune a pre-trained language model to determine relevant portions of structured data based on corresponding queries. In some implementations, the structured data corresponds to a table, and a first pre-trained language model is fine-tuned to determine relevant columns of a table, while a second pre-trained language model is fine-tuned to determine relevant rows of the table based on the remaining columns of the table. The fine-tuned language models can then be further fine-tuned to maximize the cumulative reward of an on-policy learning framework that can include a positive reward for selecting the correct portions of the structured data, a first negative reward (e.g., a penalty) for incorrect selection of portions of the structured data, and/or a second negative reward for failure to select the correct portions of the structured data. Following fine-tuning, when a user inputs a query along with input context corresponding to structured data, such as an unseen table, to prompt a pre-trained language model (e.g., an LLM, such as ChatGPT) to generate a response, the fine-tuned language model(s) can reduce the input context by determining the relevant portions of the structured data based on the query. The query and a representation of the relevant portions of the structured data can then be provided in a prompt to the pre-trained language model (e.g., the LLM) to generate a response to the query based on the reduced input context.

In operation, as described herein, a pre-trained language model is fine-tuned to determine relevant portions of structured data based on a query. For example, a pre-trained language model is fine-tuned to maximize the likelihood (e.g., the log likelihood) of determining relevant rows and/or columns of a table based on a query. In this regard, a pre-trained language model (e.g., the corresponding embeddings/parameters of the pre-trained language model) is accessed. For example, a pre-trained language model can be trained on a large and diverse dataset to learn general language patterns and contexts so that the language model can be utilized to generate output responses in response to input prompts. The pre-trained language model can then be fine-tuned to maximize the likelihood of determining relevant portions of the structured data based on a query utilizing a training data set.

In some embodiments, the training data set includes one or more structured data files, a set of questions (e.g., queries) for each of the structured data files, and portions of each of the structured data file that are relevant to each question of the set of questions. For example, the structured data files may correspond to tables and the portions of the structured data files that are relevant to each question of the set of questions may correspond to the relevant rows and/or columns of each table for the specific question. In some embodiments, a table question answer (QA) dataset (e.g., WikiTableQuestions (WTQ)) is used as training data. The table QA dataset can be annotated with text-to-SQL annotations (e.g., SQL question pairs aligned lexically (SQUALL)) in order to identify relevant rows and/or columns for the training data set based on SQL queries that correspond to each of the questions. In some embodiments, a database (e.g., a relational database), or a portion thereof, is converted to a table format in order to generate the training data. In some embodiments, a knowledge graph, or a portion thereof, is converted to a table format in order to generate the training data.

In some embodiments, two pre-trained language models are fine-tuned separately where one pre-trained language model is fine-tuned for column reduction and one pre-trained language model is fine-tuned for row reduction. For example, the fine-tuned language model for column reduction can be fine-tuned to generate an output representation of relevant columns based on a prompt with an instruction to select relevant columns, the input query, and a representation of the columns, such as list of column headers and/or data of the columns. The fine-tuned language model for row reduction can be fine-tuned to generate an output representation of relevant rows based on a prompt with an instruction to select relevant rows, the input query, and a representation of the remaining rows (e.g., after column reduction), such as list of row headers and/or data of the rows. In another example, the pre-trained language model for row reduction can be fine-tuned to generate an output representation of relevant rows based on a prompt with an instruction to select relevant rows, the input query, and a representation of the rows, such as list of row headers and/or data of the rows. The pre-trained language model for column reduction can be fine-tuned to generate an output representation of relevant columns based on a prompt with an instruction to select relevant columns, the input query, and a representation of the remaining columns (e.g., after row reduction), such as list of column headers and/or data of the columns. In some embodiments, the order of the fine-tuning the two language models and/or implementing the fine-tuned language models for column or row reduction is determined based on the amount of rows and/or columns of the corresponding table. For example, the fine-tuned language model for column reduction may reduce the number of columns for a table with more rows than columns in order to reduce the amount of data that needs to be reduced by the fine-tuned language model for row reduction. In some embodiments, the fine-tuning of each of the separate models for row reduction and column reduction are performed simultaneously.

In some embodiments, the pre-trained language model(s) is fine-tuned to maximize the likelihood of determining relevant portions of structured data based on a query using RL. For example, the fine-tuned language model(s) is further fine-tuned using policy network training in order to increase the precision of the fine-tuned language models. In some embodiments, the parameters of the fine-tuned language model(s) that maximize the likelihood of determining relevant portions of the structured data based on a query are utilized as initial policy network parameters of an on-policy learning framework. For example, each of the parameters for the initially fine-tuned language model for column reduction and the initially fine-tuned language model for row reduction are utilized as initial policy network parameters of an on-policy learning framework. In this regard, the fine-tuned language model(s) is further fine-tuned to maximize the cumulative reward by the on-policy learning framework.

In some embodiments, the on-policy learning framework includes a positive reward for the language model for determining the correct portions of the structured data, such as each relevant rows and/or each relevant columns, when the language model returns the relevant portions of the structured data in response to a query. In some embodiments, the on-policy learning framework includes a negative reward (e.g., a penalty) for determining incorrect portions of the structured data and/or failure to determine the correct portions of the structured data. For example, the on-policy learning framework can include a first negative reward for determining incorrect portions of the structured data, such as by returning irrelevant rows and/or columns in response to a query. The on-policy learning framework can include a second negative reward for failure to determine the correct portions of the structured data, such as failing to return the relevant rows and/or columns in response to a query. In some embodiments, the first negative reward for incorrect selection of rows and/or columns can be less of a penalty than the second negative reward for failure to select relevant rows and/or columns. In this regard, the first negative reward can be less of a penalty for the cumulative reward than the second negative reward as selecting some irrelevant rows and columns as relevant evidence is not preferable, but not a critical error as a pre-trained language model can still determine the answer from the relevant information during a downstream task. However, if the model fails to select the relevant rows and columns with respect to the second negative reward, a critical error occurs as the pre-trained language model is not able to perform inference at a downstream task without the necessary information.

In some embodiments, the policy network training utilizes PPO to optimize policy updates. In some embodiments, the policy network training utilizes KL divergence for the rewards and/or penalties that dynamically adapts the rewards and/or penalties at different points of the training process.

The fine-tuned language model(s) (e.g., the corresponding embeddings/parameters of the fine-tuned language model(s)) that maximizes the likelihood of determining relevant rows and/or columns of a table based on a query is output and stored. In this regard, following fine-tuning, when a user inputs a query along with input context corresponding to structured data, such as an unseen table, the fine-tuned language model(s) can reduce the input context by determining the relevant portions of the structured data, such as the relevant rows and/or columns of a table, based on the query. The query and a representation of the relevant portions of the structured data, such as a representation of the relevant rows and/or columns of a table, can then be provided to a pre-trained language model (e.g., an LLM, such as ChatGPT) to generate a response to the query. In some embodiments, the fine-tuned language model(s) is only called to reduce the input context when the structured data is over a certain size. For example, if the structured data is under a threshold size, the structured data may be sent directly to the pre-trained language model with the query to generate the response without reducing the input context. However, if the structured data is over a threshold size, the fine-tuned language model(s) reduces the input context for the pre-trained language model by determining the relevant portions of the structured data, such as relevant rows and/or columns of a table, based on the query. In some embodiments, the fine-tuned language model(s) reduces the input context for structured data and/or input context of any size. In some embodiments, the fine-tuned language model(s) only reduces the input context when the input context is over the maximum token limit of the LLM. In some embodiments, the fine-tuned language model(s) reduces the input context for structured data even when the input context is within the maximum token limit of the LLM. For example, the fine-tuned language model(s) reduces the structured data of the input context for any size or above a threshold token amount (e.g., 100 tokens) that is below the maximum token limit of the LLM (e.g., 4096 tokens).

In some embodiments, when the structured data of the input context is a database (e.g., a relational database), the database, or a portion thereof, is converted to a table format in order for the fine-tuned language model(s) to reduce the input context by determining the relevant rows and/or columns of the table based on the query. In some embodiments, when the structured data of the input context is a knowledge graph, the knowledge graph, or a portion thereof, is converted to a table format in order for the fine-tuned language model(s) to reduce the input context by determining the relevant rows and/or columns of the table based on the query.

In some embodiments, the representation of the relevant portions of the structured data that is provided to the pre-trained language model (e.g., the LLM) for the downstream task to generate a response to the query is the relevant rows and columns of a table in table format. In some embodiments, the representation of the relevant portions of the structured data that is provided to the pre-trained language model for the downstream task to generate a response to the query is the relevant rows and columns of a table in string format. In some embodiments, the representation of the relevant portions of the structured data that is provided to the pre-trained language model for the downstream task to generate a response to the query is the relevant rows and columns of a table in natural language format.

Advantageously, efficiencies of computing and network resources can be enhanced using implementations described herein. In particular, the reduced representation of the structured data generated by a fine-tuned language model to reduce the input context of the structured data provided to an LLM provides for a more efficient use of computing and network resources (e.g., less operations, higher throughput and reduced latency for a network, less packet generation costs, etc.) than prior methods. For example, using implementations described herein enhances efficiencies of computing and network resources with respect to prior methods of manually editing the structured data in order to reduce errors from a language model caused by the structured data and/or providing multiple prompts to costly language models, such as GPT4, to reduce the structured data where the costly language models will still often output errors based on the complexities of the structured data.

Overview of Exemplary Environments of Using a Fine-Tuned Language Model to Reduce Representations of Structured Data Turning to the figures, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 7.

It should be understood that operating environment 100 shown in FIG. 1 is an example of one suitable operating environment. Among other components not shown, operating environment 100 includes a user device 102, application 110, network 104, pre-trained language model 106, and structured data fine-tuning and prompting manager 108. Operating environment 100 also shows fine-tuning data sources 112 that stores training data, for example, to be used to fine-tune the language model 116 to reduce representation of structured data. Each of the components shown in FIG. 1 can be implemented via any type of computing device, such as one or more of computing device 700 described in connection to FIG. 7, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual or entity interested in fine-tuning a language model to reduce representations of structured data. For example, in some implementations, such devices are the type of computing device described in relation to FIG. 7. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

Figure 2:
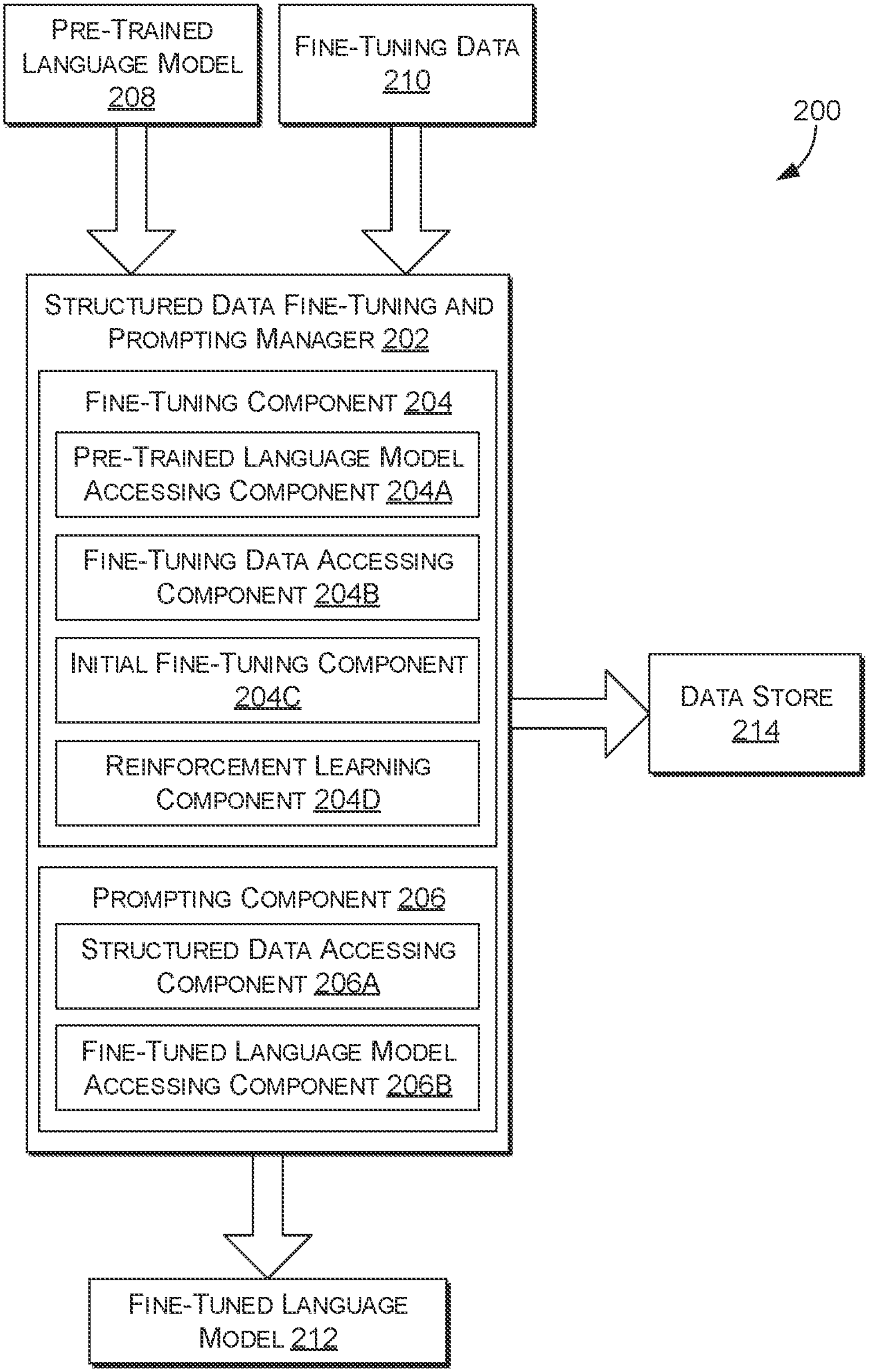
FIG. 2 depicts an example configuration of an operating environment in which some implementations of the present disclosure can be employed, in accordance with various embodiments of the present disclosure.
Figure 3:
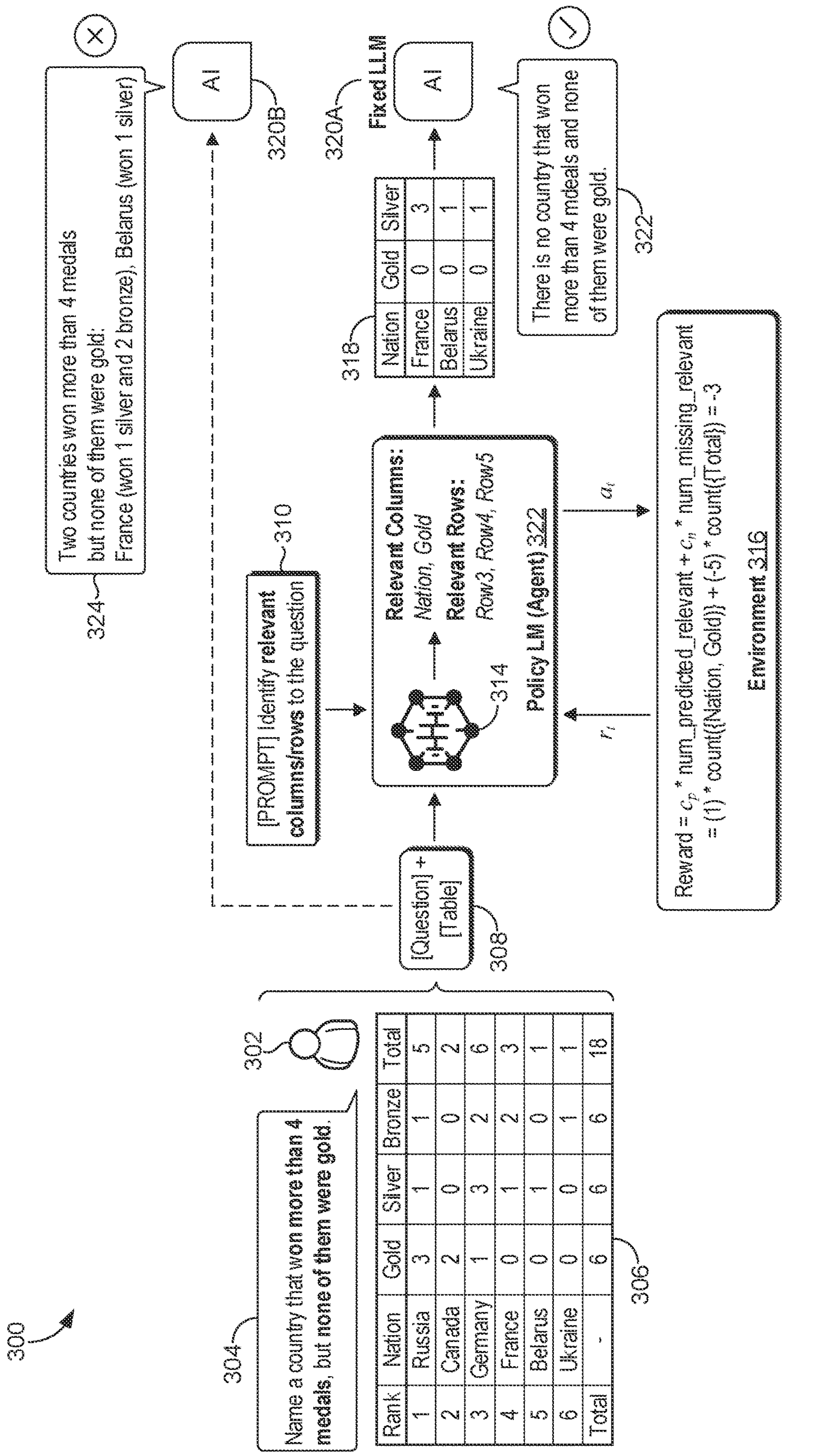
FIG. 3 provides an example diagram of using a fine-tuned language model to reduce representations of structured data as contextual input to a pre-trained language model, in accordance with embodiments of the present disclosure.

Application 110 operating on user device 102 can generally be any application capable of facilitating the fine-tuning of a pre-trained language model 106 by structured data fine-tuning and prompting manager 108 and/or facilitating the reducing the representation of structured data by a fine-tuned language model (e.g., fine-tuned language model 212 of FIG. 2 and/or fine-tuned language model 314) to reduce the input context provided while prompting a pre-trained language model 106 (e.g., fixed LLM 320A of FIG. 3). Application 110 operating on user device 102 can also provide user interfaces for the presentation of input/output to and/or from language models. In some implementations, the application 110 comprises a web application, which can run in a web browser, and could be hosted at least partially server-side (e.g., via structured data fine-tuning and prompting manager 108). In addition, or instead, the application 110 can comprise a dedicated application. In some cases, the application 110 is integrated into the operating system (e.g., as a service). It is therefore contemplated herein that "application" be interpreted broadly.

User device 102 can be a client device on a client-side of operating environment 100, while pre-trained language model 106 and/or structured data fine-tuning and prompting manager 108 can be on a server-side of operating environment 100. Pre-trained language model 106, language model 116, and/or structured data fine-tuning and prompting manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or structured data fine-tuning and prompting manager 108 to remain as separate entities.

At a high level, structured data fine-tuning and prompting manager 108 performs various functionality to facilitate efficient and effective fine-tuning of a language model and/or use of a fine-tuned language model to reduce representations of structured data in order to reduce the contextual input provided to a pre-trained language model to generate a response to a prompt. The structured data fine-tuning and prompting manager 108 and/or pre-trained language model 106 can communicate with application 110 in order for application 110 to display input/output to and/or from language models via a display screen of the user device 102. In this regard, structured data fine-tuning and prompting manager 108 can communicate with pre-trained language model 106 in order to fine-tune pre-trained language model 106 (e.g., to generate fine-tuned language model 212 of FIG. 2).

In operation, pre-trained language model 106 (e.g., pre-trained language model 208 of FIG. 2) is fine-tuned by structured data fine-tuning and prompting manager 108 (e.g., structured data fine-tuning and prompting manager 202 of FIG. 2) to determine relevant portions of a structured data file based on a query. For example, pre-trained language model 106 is fine-tuned by structured data fine-tuning and prompting manager 108 to maximize the likelihood (e.g., the log likelihood) of determining relevant rows and/or columns of a table based on a query. In this regard, pre-trained language model 106 (e.g., the corresponding embeddings/parameters of the pre-trained language model) is accessed. For example, pre-trained language model 106 can be pre-trained on a large and diverse dataset to learn general language patterns and contexts so that the language model can be utilized to generate output responses in response to input prompts. The pre-trained language model 106 can then be fine-tuned by structured data fine-tuning and prompting manager 108 to maximize the likelihood of determining relevant portions of a structured data file based on a query utilizing a training data set from fine-tuning data sources 112.

In some embodiments, the training data set (e.g., fine-tuning data 210 of FIG. 2) from fine-tuning data sources 112 includes one or more structured data files, a set of questions for each of the structured data files, and portions of each of the structured data file that are relevant to each question of the set of questions. For example, the structured data files may correspond to tables and the portions of the structured data files that are relevant to each question of the set of questions may correspond to the relevant rows and/or columns of each table for the specific question. In some embodiments, a table QA dataset (e.g., WTQ) is used as training data. The table QA dataset can be annotated with text-to-SQL annotations (e.g., SQUALL) in order to identify relevant rows and/or columns for the training data set based on SQL queries that correspond to each of the questions. In some embodiments, a database (e.g., a relational database), or a portion thereof, is converted to a table format in order to generate the training data from fine-tuning data sources 112. In some embodiments, a knowledge graph, or a portion thereof, is converted to a table format in order to generate the training data from fine-tuning data sources 112.

In some embodiments, two pre-trained language models are fine-tuned separately by structured data fine-tuning and prompting manager 108 where one pre-trained language model 106 is fine-tuned for column reduction and one pre-trained language model 106 is fine-tuned for row reduction. For example, the fine-tuned language model for column reduction can be fine-tuned by structured data fine-tuning and prompting manager 108 to generate an output representation of relevant columns based on a prompt with an instruction to select relevant columns, the input query, and a representation of the columns, such as list of column headers and/or data of the columns (e.g., as stored in data store 214 of FIG. 2). The fine-tuned language model for row reduction can be fine-tuned by structured data fine-tuning and prompting manager 108 to generate an output representation of relevant rows based on a prompt with an instruction to select relevant rows, the input query, and a representation of the remaining rows (e.g., after column reduction), such as list of row headers and/or data of the rows (e.g., as stored in data store 214 of FIG. 2). In another example, the pre-trained language model for row reduction can be fine-tuned by structured data fine-tuning and prompting manager 108 to generate an output representation of relevant rows based on a prompt with an instruction to select relevant rows, the input query, and a representation of the rows, such as list of row headers and/or data of the rows (e.g., as stored in data store 214 of FIG. 2). The pre-trained language model for column reduction can be fine-tuned by structured data fine-tuning and prompting manager 108 to generate an output representation of relevant columns based on a prompt with an instruction to select relevant columns, the input query, and a representation of the remaining columns (e.g., after row reduction), such as list of column headers and/or data of the columns (e.g., as stored in data store 214 of FIG. 2). In some embodiments, the order of the fine-tuning the two language models and/or implementing the fine-tuned language models for column or row reduction is determined by structured data fine-tuning and prompting manager 108 based on the amount of rows and/or columns of the corresponding table. For example, the fine-tuned language model for column reduction may reduce the number of columns for a table with more rows than columns in order to reduce the amount of data that needs to be reduced by the fine-tuned language model for row reduction. In some embodiments, the fine-tuning of each of the separate models for row reduction and column reduction can be performed simultaneously by structured data fine-tuning and prompting manager 108.

In some embodiments, the pre-trained language model 106 (e.g., or each of the pre-trained language models) is fine-tuned to maximize the likelihood of determining relevant portions of structured data based on a query using RL by structured data fine-tuning and prompting manager 108. For example, the fine-tuned language model is further fine-tuned using policy network training by structured data fine-tuning and prompting manager 108 in order to increase the precision of the fine-tuned language model. In some embodiments, the parameters of the fine-tuned language model that maximize the likelihood of determining relevant portions of structured data based on a query are utilized as initial policy network parameters of an on-policy learning framework by structured data fine-tuning and prompting manager 108. For example, each of the parameters for the initially fine-tuned language model for column reduction and the initially fine-tuned language model for row reduction are utilized by structured data fine-tuning and prompting manager 108 as initial policy network parameters of an on-policy learning framework. In this regard, the fine-tuned language model is further fine-tuned to maximize the cumulative reward by the on-policy learning framework by structured data fine-tuning and prompting manager 108.

In some embodiments, the on-policy learning framework implemented by structured data fine-tuning and prompting manager 108 includes a positive reward for the language model for determining the correct portions of the structured data, such as each relevant rows and/or each relevant columns, when the language model returns the relevant portions of the structured data in response to a query. In some embodiments, the on-policy learning framework implemented by structured data fine-tuning and prompting manager 108 includes a negative reward (e.g., a penalty) for determining incorrect portions of the structured data and/or failure to determine the correct portions of the structured data. For example, the on-policy learning framework implemented by structured data fine-tuning and prompting manager 108 can include a first negative reward for determining incorrect portions of the structured data, such as by returning irrelevant rows and/or columns in response to a query. The on-policy learning framework implemented by structured data fine-tuning and prompting manager 108 can include a second negative reward for failure to determine the correct portions of the structured data, such as failing to return the relevant rows and/or columns in response to a query. In some embodiments, the first negative reward for incorrect selection of rows and/or columns can be less of a penalty for the cumulative reward than the second negative reward for failure to select relevant rows and/or columns. In this regard, the first negative reward can be less of a penalty for the cumulative reward than the second negative reward as selecting some irrelevant rows and columns as relevant evidence is not preferable, but not a critical error as a pre-trained language model can still determine the answer from the relevant evidence during a downstream task. However, if the model fails to select the relevant rows and columns with respect to the second negative reward, a critical error occurs as the pre-trained language model is not able to perform inference at a downstream task without the necessary information.

In some embodiments, the policy network training implemented by structured data fine-tuning and prompting manager 108 utilizes PPO to optimize policy updates. In some embodiments, the policy network training implemented by structured data fine-tuning and prompting manager 108 utilizes KL divergence for the rewards and/or penalties that dynamically adapts the rewards and/or penalties at different points of the training process.

The fine-tuned language model(s) (e.g., the corresponding embeddings/parameters of the fine-tuned language model(s)) that maximizes the likelihood of determining relevant rows and/or columns of a table based on a query is output by structured data fine-tuning and prompting manager 108 and stored (e.g., in data store 214 of FIG. 2).

An example of a prompt by a user received by structured data fine-tuning and prompting manager 108 is shown in FIG. 3. Turning briefly to FIG. 3, when a user 302 inputs a query 304 along with input context 306 corresponding to structured data, such as an unseen table, the fine-tuned language model 314 can reduce the input context by determining the relevant portions of the structured data, such as the relevant rows and/or columns of a table, based on the query. The query 304 and a representation of the relevant portions of the structured data 318, such as a representation of the relevant rows and/or columns of a table, can then be provided to a pre-trained language model 320A (e.g., an LLM, such as ChatGPT) to generate a response 322 to the query 302.

Returning to FIG. 1, in some embodiments, the fine-tuned language model is only called by structured data fine-tuning and prompting manager 108 (e.g., by prompting component 206 of FIG. 2) to reduce the input context when the structured data is over a certain size. For example, if the structured data is under a threshold size, the structured data may be sent directly to the pre-trained language model (e.g., an LLM) with the query to generate the response without reducing the input context. However, if the structured data is over a threshold size, the fine-tuned language model reduces the input context for the pre-trained language model (e.g., the LLM) by determining the relevant portions of the structured data, such as relevant rows and/or columns of a table, based on the query. In some embodiments, the fine-tuned language model is called by structured data fine-tuning and prompting manager 108 to reduce the input context for structured data and/or input context of any size. In some embodiments, the fine-tuned language model is only called by structured data fine-tuning and prompting manager 108 to reduce the input context when the input context is over the maximum token limit of the LLM. In some embodiments, the fine-tuned language model is called by structured data fine-tuning and prompting manager 108 to reduce the input context for structured data even when the input context is within the maximum token limit of the LLM. For example, the fine-tuned language model is called by structured data fine-tuning and prompting manager 108 to reduce the structured data of the input context for any size or above a threshold token amount (e.g., 100 tokens) that is below the maximum token limit of the LLM (e.g., 4096 tokens).

In some embodiments, when the structured data of the input context is a database (e.g., a relational database), the database, or a portion thereof, is converted to a table format by structured data fine-tuning and prompting manager 108 in order for the fine-tuned language model to reduce the input context by determining the relevant rows and/or columns of the table based on the query. In some embodiments, when the structured data of the input context is a knowledge graph, the knowledge graph, or a portion thereof, is converted to a table format by structured data fine-tuning and prompting manager 108 in order for the fine-tuned language model(s) to reduce the input context by determining the relevant rows and/or columns of the table based on the query.

In some embodiments, the representation of the relevant portions of the structured data that is provided to the pre-trained language model by structured data fine-tuning and prompting manager 108 to generate a response to the query is the relevant rows and columns of a table in table format. In some embodiments, the representation of the relevant portions of the structured data that is provided to the pre-trained language model by structured data fine-tuning and prompting manager 108 to generate a response to the query is the relevant rows and columns of a table in string format. In some embodiments, the representation of the relevant portions of the structured data that is provided to the pre-trained language model by structured data fine-tuning and prompting manager 108 to generate a response to the query is the relevant rows and columns of a table in natural language format.

Structured data fine-tuning and prompting manager 108 and pre-trained language model 106 can each be or include a server, including one or more processors, and one or more computer-readable media. The computer-readable media includes computer-readable instructions executable by the one or more processors. The instructions can optionally implement one or more components of structured data fine-tuning and prompting manager 108, and pre-trained language model 106, described in additional detail below with respect to structured data fine-tuning and prompting manager 202 of FIG. 2.

For cloud-based implementations, the instructions on structured data fine-tuning and prompting manager 108 and pre-trained language model 106 can implement one or more components, and application 110 can be utilized by a user to interface with the functionality implemented on structured data fine-tuning and prompting manager 108 and pre-trained language model 106. In some cases, application 110 comprises a web browser. In other cases, structured data fine-tuning and prompting manager 108 and/or pre-trained language model 106 may not be required. For example, the components of structured data fine-tuning and prompting manager 108 and/or pre-trained language model 106 may be implemented completely on a user device, such as user device 102. In this case, structured data fine-tuning and prompting manager 108 and/or pre-trained language model

106 may be embodied at least partially by the instructions corresponding to application 110.

Thus, it should be appreciated that structured data fine-tuning and prompting manager 108 and pre-trained language model 106 may be provided via multiple devices arranged in a distributed environment that collectively provide the functionality described herein. Additionally, other components not shown may also be included within the distributed environment. In addition, or instead, structured data fine-tuning and prompting manager 108 and/or pre-trained language model 106 can be integrated, at least partially, into a user device, such as user device 102. Furthermore, structured data fine-tuning and prompting manager 108 and/or pre-trained language model 106 may at least partially be embodied as a cloud computing service.

Referring to FIG. 2, aspects of an illustrative language model fine-tuning and evaluation management system 200 are shown, in accordance with various embodiments of the present disclosure. At a high level, the structured data fine-tuning and prompting management system 200 can facilitate efficient and effective fine-tuning of a language model and/or use of a fine-tuned language model to reduce representations of structured data in order to reduce the contextual input provided to a pre-trained language model to generate a response to a prompt.

As shown in FIG. 2, structured data fine-tuning and prompting manager 202 includes fine-tuning component 204 and prompting component 206. Structured data fine-tuning and prompting manager 202 can fine-tune pre-trained language model 208 (e.g., through fine-tuning component 204) based on fine-tuning data 210 (e.g., which may be stored in data store 214) to reduce representations of structured data and store the fine-tuned embeddings of the fine-tuned language model 212 in data store 214. Structured data fine-tuning and prompting manager 202 can prompt pre-trained language model 208 with reduced representations of structured data generated by fine-tuned language model 212 and store the prompts, inputs, and/or outputs in data store 214. The structured data fine-tuning and prompting manager 202 can communicate with the data store 214. The data store 214 is configured to store various types of information accessible by structured data fine-tuning and prompting manager 202, or other server or component. The foregoing components of structured data fine-tuning and prompting manager 202 can be implemented, for example, in operating environment 100 of FIG. 1. In particular, those components may be integrated into any suitable combination of user devices 102, pre-trained language model 106, and/or structured data fine-tuning and prompting manager 108.

In embodiments, data sources, user devices (e.g., user device 102 of FIG. 1), and structured data fine-tuning and prompting manager 202 can provide data to the data store 214 for storage, which may be retrieved or referenced by any such component. As such, the data store 214 can store computer instructions (e.g., software program instructions, routines, or services), data and/or models used in embodiments described herein, such as data for fine-tuning a language model (e.g., fine-tuning data 210), output generated by pre-trained language model 208 and/or fine-tuned language model 212, prompts for pre-trained language model 208 and/or fine-tuned language model 212, and/or the like. In some implementations, data store 214 can store information or data received or generated via the various components of structured data fine-tuning and prompting manager 202 and provides the various components with access to that information or data, as needed. The information in data store 214 may be distributed in any suitable manner across one or more data stores for storage (which may be hosted externally).

The pre-trained language model 208 is generally configured to be any type of language model that can be fine-tuned (e.g., by fine-tuning component 204) to reduce representations of structured data. In some embodiments, the pre-trained language model 208 is generally configured to be any type of language model that can be prompted (e.g., by prompting component 206) with reduced representations of structured data generated by fine-tuned language model 212.

The fine-tuning component 204 and each of the components of fine-tuning component 204 are generally configured to fine-tune pre-trained language model 208 (e.g., based on fine-tuning data 210) to reduce representation of structured data. In embodiments, fine-tuning component 204 and each of the components of fine-tuning component 204 can include rules, conditions, associations, models, algorithms, or the like to fine-tune pre-trained language model 208. Fine-tuning component 204 and each of the components of fine-tuning component 204 may take on different forms depending on the mechanism used to fine-tune pre-trained language model 208. For example, fine-tuning component 204 and each of the components of fine-tuning component 204 may comprise natural language processing techniques, a statistical model, fuzzy logic, neural network, finite state machine, support vector machine, logistic regression, clustering, or machine-learning techniques, similar statistical classification processes, or combinations of these to fine-tune pre-trained language model 208.

In embodiments, pre-trained language model 208 is fine-tuned by fine-tuning component 204 to determine relevant portions of a structured data based on a query. In this regard, pre-trained language model accessing component 204A accesses embeddings/parameters of pre-trained language model 208. Fine-tuning data accessing component 204B can access training data (e.g., fine-tuning data 210). The training data includes one or more structured data files, a set of questions for each of the structured data files, and portions of each of the structured data file that are relevant to each question of the set of questions. In some embodiments, a database (e.g., a relational database), or a portion thereof, is converted to a table format by fine-tuning data accessing component 204B in order to generate the training data. In some embodiments, a knowledge graph, or a portion thereof, is converted to a table format by fine-tuning data accessing component 204B in order to generate the training data.

The training data (e.g., fine-tuning data 210) is used by initial fine-tuning component 204C to fine-tune pre-trained language model 208 to maximize the likelihood (e.g., the log likelihood) of determining relevant portions of the structured data based on a query. For example, initial fine-tuning component 204C fine-tunes pre-trained language model 208 to maximize the likelihood of determining relevant rows and/or columns of a table based on a query. In some embodiments, initial fine-tuning component 204C fine-tunes two pre-trained language models, each corresponding to pre-trained language model 208 where one pre-trained language model is fine-tuned for column reduction and one pre-trained language model is fine-tuned for row reduction.

In implementations, an input space can be defined including an input context c and a task description X, and an output space Y. In the task of providing an answer to a question based on an input table (e.g., a table QA task), the input context c is an input context (e.g., a table), the task description x is an input question (e.g., the user query/question), and the output label y is an answer to the question. A model (•)

can be trained that generates a reduced context z, given a task description x and a context c, namely (z|x). A policy LM, $\theta_{LM}$ (Z|x,c) can be trained that learns to generate a reduced input context z, given an input context and a question. In this regard, an LLM (e.g., ChatGPT) can be prompted with the reduced context information to generate an output. In this regard, $\psi_{LLM}$ is a fixed LLM model used for question answering, the final output is $y \sim \psi_{LLM}(\cdot|x,z)$.

Initial fine-tuning component 204C first fine-tunes a pre-trained language model 208 to obtain relevant parts of the context given a question. In some embodiments, a sequence to sequence language model is utilized as pre-trained language model 208. In some embodiments, pre-trained language model 208 is fine-tuned utilizing the annotation of relevant rows and columns for each question and table pair of fine-tuning data 210. In some embodiments, pre-trained language model 208 and/or each model for column reduction and row reduction can fine-tuned by maximizing the log-likelihood as follows:

$$\mathcal{L} = -\mathbb{E}\log\theta_{LM}(z \mid x, c)$$

In some embodiments, initial fine-tuning component 204C fine-tunes two models separately, one for column reduction, and the other for row reduction. In this regard, initial fine-tuning component 204C fine-tunes two models separately to maximize the log likelihood of selecting the correct relevant rows and columns, given a question and a table. For example, the fine-tuned language model for column reduction can be fine-tuned to generate an output representation of relevant columns based on a prompt with an instruction to select relevant columns, the input query, and a representation of the columns, such as list of column headers and/or data of the columns. The fine-tuned language model for row reduction can be fine-tuned to generate an output representation of relevant rows based on a prompt with an instruction to select relevant rows, the input query, and a representation of the remaining rows (e.g., after column reduction), such as list of row headers and/or data of the rows. In this example, it is assumed that the columns are already reduced with 100% accuracy and represent row items only with necessary columns. In another example, the pre-trained language model for row reduction can be fine-tuned to generate an output representation of relevant rows based on a prompt with an instruction to select relevant rows, the input query, and a representation of the rows, such as list of row headers and/or data of the rows. The pre-trained language model for column reduction can be fine-tuned to generate an output representation of relevant columns based on a prompt with an instruction to select relevant columns, the input query, and a representation of the remaining columns (e.g., after row reduction), such as list of column headers and/or data of the columns. In this example, it is assumed that the rows are already reduced with 100% accuracy and represent row items only with necessary columns.

In some embodiments, the pre-trained language model(s) 208 is fine-tuned to maximize the likelihood of determining relevant portions of structured data based on a query using RL by reinforcement learning component 204D. For example, the fine-tuned language model(s) are further fine-tuned using policy network training in order to increase the precision of the fine-tuned language models by reinforcement learning component 204D. In some embodiments, the parameters of the fine-tuned language model(s) that maximize the likelihood of determining relevant portions of structured data based on a query generated by initial fine-tuning component 204C are utilized as initial policy network parameters of an on-policy learning framework by reinforcement learning component 204D. For example, each of the parameters for the initially fine-tuned language model for column reduction and the initially fine-tuned language model for row reduction are utilized as initial policy network parameters of an on-policy learning framework by reinforcement learning component 204D. In this regard, the fine-tuned language models for column reduction and row reduction are further fine-tuned to maximize the cumulative reward by the on-policy learning framework by reinforcement learning component 204D.

In embodiments, although fine-tuning guides the LM to generate the gold label, the model is further fine-tuned by reinforcement learning component 204D by maximizing some rewards R. In some embodiments, the on-policy learning framework implemented by reinforcement learning component 204D includes a positive reward for the language model for determining the correct portions of the structured data, such as each relevant rows and/or each relevant columns, when the language model returns the relevant portions of the structured data in response to a query. In some embodiments, the on-policy learning framework implemented by reinforcement learning component 204D includes a negative reward (e.g., a penalty) for determining incorrect portions of the structured data and/or failure to determine the correct portions of the structured data. For example, the on-policy learning framework implemented by reinforcement learning component 204D can include a first negative reward for determining incorrect portions of the structured data, such as by returning irrelevant rows and/or columns in response to a query. The on-policy learning framework implemented by reinforcement learning component 204D can include a second negative reward for failure to determine the correct portions of the structured data, such as failing to return the relevant rows and/or columns in response to a query. In some embodiments, the first negative reward for incorrect selection of rows and/or columns can be less of a penalty than the second negative reward for failure to select relevant rows and/or columns. In this regard, the first negative reward can be less of a penalty for the cumulative reward than the second negative reward as selecting some irrelevant rows and columns as relevant evidence is not preferable, but not a critical error as a pre-trained language model can still determine the answer from the relevant evidence during a downstream task. However, if the model fails to select the relevant rows and columns with respect to the second negative reward, a critical error occurs as the pre-trained language model is not able to perform inference at a downstream task without the necessary information.

The parameter update condition of the on-policy learning framework implemented by reinforcement learning component 204D can be formally defined to maximize the following objective:

$$\max_{\theta_{LM}} \mathbb{E}_{z \sim \theta_{LM}(\cdot|x,c)}[\mathcal{R}(x, z)]$$

In some embodiments, in order to make the optimization tractable for policy network, proximal policy optimization (PPO) is utilized. In this regard, the fine-tuned language model as output by initial fine-tuning component 204C is utilized by reinforcement learning component 204D as an initial policy network (i.e., $\pi_0=\theta_{LM}$) and update w using PPO. In some embodiments, the language model's generation of relevant information is considered a Markov Decision Process <S,A,r,P>, where S is a state space, A is an action space, r is a reward function, and P is transition probabilities. In this regard, at each time step t in an episode, the model selects an action (i.e., generating tokens of relevant information) from A, based on the state. The state at time t is defined with the input and the language model's previous generations. The episode ends when the language model $\pi(z|x,z_{<t})$ generates an end-of-sequence token.

In some embodiments, the policy network training implemented by reinforcement learning component 204D utilizes KL divergence for the rewards and/or penalties that dynamically adapts the rewards and/or penalties at different points of the training process. In this regard, the least probable tokens can be masked out using top-p sampling. In some embodiments, p is set as 0.9. In some embodiments, the reward function r(x,z) of the policy network implemented by reinforcement learning component 204D is defined as follows:

$$r(x, z) = \mathcal{R}(x, z) - \beta\log\frac{\pi(z \mid x, c)}{\theta_{LM}(z \mid x, c)}$$

In this regard, RL can be used to optimize the fine-tuned embeddings of fine-tuned language model 212. In some embodiments, RL can be used to optimize the fine-tuned embeddings of each of the fine-tuned model for column reduction and the fine-tuned model for row reduction of fine-tuned language model 212.

In some embodiments, reward and/or penalties are added for downstream tasks to further fine-tune the fine-tuned language model by reinforcement learning component 204D. For example, after the fine-tuned language model 212 provides the reduced representation of the structured data to the LLM to generate an answer, the on-policy learning framework implemented by reinforcement learning component 204D can include a positive reward for answering the question correctly and/or a negative reward (e.g., penalty) for answering the question incorrectly. In some embodiments, the fine-tuned language model 212 can be trained to keep some of the irrelevant portions of the structured data of the input context in order to help the LLM understand the table for the downstream task. In this regard, if the on-policy learning framework implemented by reinforcement learning component 204D includes a positive reward for answering the question correctly and/or a negative reward (e.g., penalty) for answering the question incorrectly, the fine-tuned language model 212 can learns to be "more lenient" in removing irrelevant items. In some embodiments, the fine-tuned language model 212 can be fine-tuned to include a measurement (e.g., ranking) of importance of each of the relevant portions of the structured data. For example, the fine-tuned language model 212 can be fine-tuned with losses corresponding to the measurement (e.g., ranking) of importance of each of the relevant portions of the structured data. In some embodiments, the action space A can be narrowed down by the fine-tuned language model 212 and/or the fine-tuning data accessing component 204B into the schema used in internal table data.

Fine tuning component 204 then stores the fine-tuned language model 212 (e.g., the corresponding embeddings/parameters of the fine-tuned language model) in data store 214.

The prompting component 204D and each of its components are generally configured to utilize a fine-tuned language model 212 to reduce representations of structured data in order to reduce the contextual input provided to a pre-trained language model (e.g., an LLM, such as ChatGPT) to generate a response to a prompt. In embodiments, prompting component 204D and each of its components can include rules, conditions, associations, models, algorithms, or the like to utilize a fine-tuned language model 212 to reduce representations of structured data in order to reduce the contextual input provided to a pre-trained language model. Prompting component 204D and each of its components may take on different forms depending on the mechanism used to utilize a fine-tuned language model 212 to reduce representations of structured data in order to reduce the contextual input provided to a pre-trained language model. For example, prompting component 204D and each of its components may comprise natural language processing techniques, a statistical model, fuzzy logic, neural network, finite state machine, support vector machine, logistic regression, clustering, or machine-learning techniques, similar statistical classification processes, or combinations of these.

In embodiments, when a user inputs a query along with input context corresponding to structured data, such as an unseen table, prompting component 206 can prompt the fine-tuned language model 212 via fine-tuned language model accessing component 206B to reduce the input context by determining the relevant portions of the structured data, such as the relevant rows and/or columns of a table, based on the query. Prompting component 206 can then provide the query and a representation of the relevant portions of the structured data, such as a representation of the relevant rows and/or columns of a table, to a pre-trained language model (e.g., an LLM, such as ChatGPT) to generate a response to the query.

In some embodiments, the fine-tuned language model 212 is only called by fine-tuned language model accessing component 206B to reduce the input context when the structured data is over a certain size. For example, if the structured data is under a threshold size as determined by structured data accessing component 206A, the structured data may be sent directly to the pre-trained language model by prompting component 206 with the query to generate the response without reducing the input context. However, if the structured data is over a threshold size as determined by structured data accessing component 206A, prompting component 206 can prompt the fine-tuned language model 212 via fine-tuned language model accessing component 206B to reduce the input context for the pre-trained language model by determining the relevant portions of the structured data, such as relevant rows and/or columns of a table, based on the query.

In some embodiments, when the structured data of the input context is a database (e.g., a relational database), the database, or a portion thereof, is converted by to a table format by structured data accessing component 206A in order for the fine-tuned language model 212 to reduce the input context by determining the relevant rows and/or columns of the table based on the query. In some embodiments, when the structured data of the input context is a knowledge graph, the knowledge graph, or a portion thereof, is converted to a table format by structured data accessing component 206A in order for the fine-tuned language model 212 to reduce the input context by determining the relevant rows and/or columns of the table based on the query.

In some embodiments, the representation of the relevant portions of the structured data that is provided to the pre-trained language model by prompting component 206 to generate a response to the query is the relevant rows and columns of a table in table format. In some embodiments, the representation of the relevant portions of the structured data that is provided to the pre-trained language model by prompting component 206 to generate a response to the query is the relevant rows and columns of a table in string format. In some embodiments, the representation of the relevant portions of the structured data that is provided by prompting component 206 to the pre-trained language model to generate a response to the query is the relevant rows and columns of a table in natural language format.

FIG. 3 provides an example diagram 300 of using a fine-tuned language model to reduce representations of structured data as contextual input to a pre-trained language model, in accordance with embodiments of the present disclosure. As shown in FIG. 3, a user 302 inputs a query 304 along with input context 306 corresponding to a table. The query and table 308 are provided to fine-tuned language model 314 with a prompt 310 including an instruction to identify the relevant rows and/or columns of the table based on the query. The fine-tuned language model 314 outputs the relevant rows and columns 318. The relevant rows and columns 318 are provided with the query 304 to fixed LLM 320A which provides a correct answer 322 to the query. In this regard, fine-tuned language model 314 is a policy agent 312 that maximizes the reward of environment 316 to predict the relevant rows and columns of the table based on the query. As can be understood, if the input context was not reduced and the query and table 308 are provided to fixed LLM 320B, fixed LLM 320B outputs incorrect answer 324.

Figure 4:
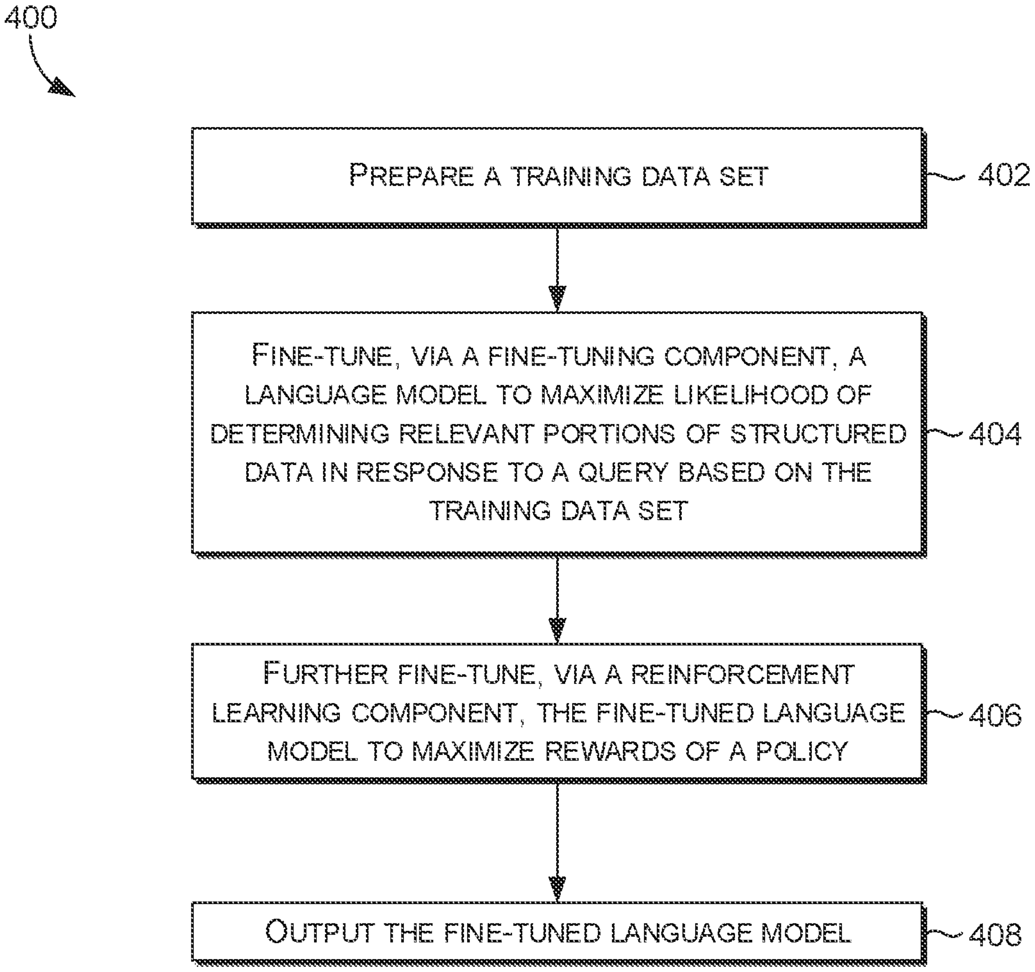
FIG. 4 is a process flow showing a method for fine-tuning a language model to reduce representations of structured data, in accordance with embodiments of the present disclosure.
Figure 5:
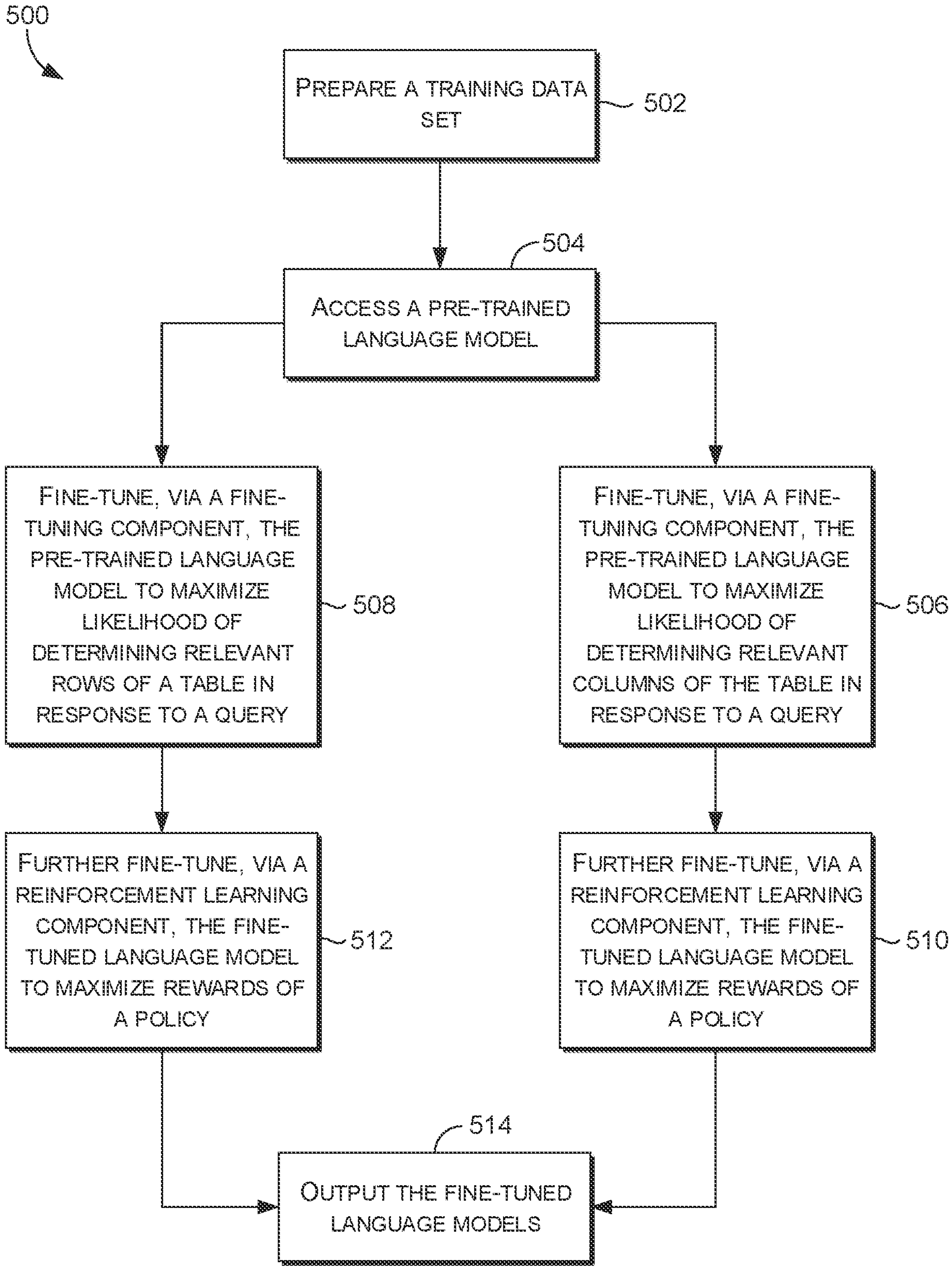
FIG. 5 is a process flow showing another method for fine-tuning a language model to reduce representations of structured data, in accordance with embodiments of the present disclosure.
Figure 6:
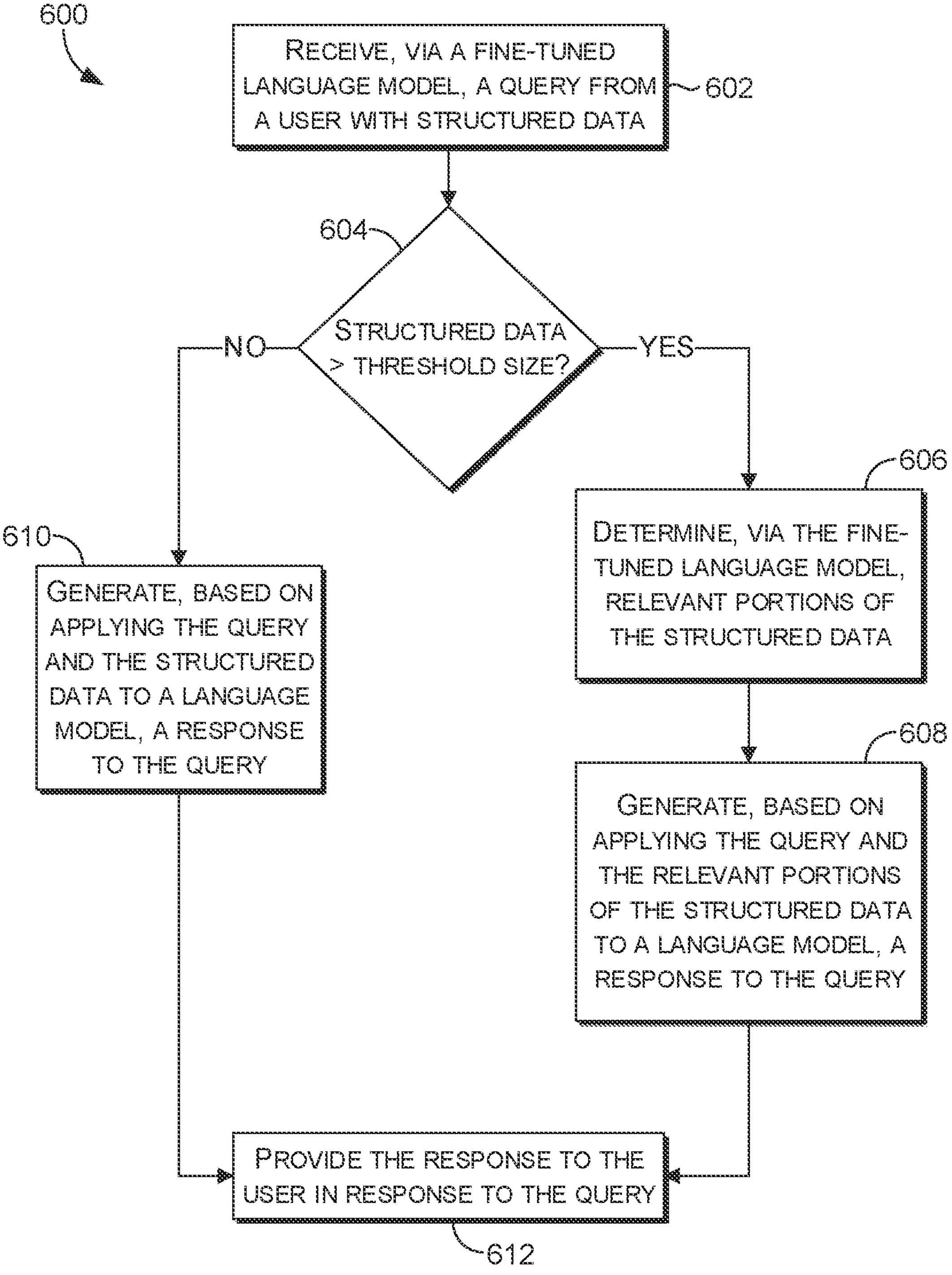
FIG. 6 is a process flow showing a method of using a fine-tuned language model to reduce representations of structured data as contextual input to a pre-trained language model, in accordance with embodiments of the present disclosure.

Exemplary Implementation of Using a Fine-Tuned Language Model to Reduce Representations of Structured Data With reference now to FIGS. 4-6, FIGS. 4-6 provide method flows related to using a fine-tuned language model to reduce representations of structured data, in accordance with embodiments of the present technology. Each block of method 400, 500 and 600 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 4-6 are exemplary only and not intended to be limiting. As can be appreciated, in some embodiments, method flows 400-600 can be implemented, at least in part, to facilitate using a fine-tuned language model to reduce representations of structured data in order to reduce the contextual input provided to a pre-trained language model to generate a response to a prompt.

Turning initially to FIG. 4, a flow diagram is provided showing an embodiment of a method 400 for fine-tuning a language model to reduce representations of structured data, in accordance with embodiments described herein. Such reduced representation of the structured data generated by a fine-tuned language model can be used to efficiently and effectively reduce the input context of the structured data provided to an LLM.

Initially, at block 402, a training data set is prepared. In some embodiments, the training data set includes one or more structured data files, a set of questions (e.g., queries) for each of the structured data files, and portions of each of the structured data file that are relevant to each question of the set of questions. For example, the structured data files may correspond to tables and the portions of the structured data files that are relevant to each question of the set of questions may correspond to the relevant rows and/or columns of each table for the specific question.

At block 404, a language model is fine-tuned via a fine-tuning component to maximize likelihood of determining relevant portions of structured data in response to a query based on the training data set. For example, the language model is fine-tuned to maximize likelihood of determining relevant rows and columns of a table in response to a query.

At block 406, the fine-tuned language model is further fine-tuned, via a reinforcement learning component, to maximize rewards of a policy. In some embodiments, the parameters of the fine-tuned language model that maximize the likelihood of determining relevant portions of structured data based on a query are utilized as initial policy network parameters of an on-policy learning framework. In this regard, the fine-tuned language model(s) is further fine-tuned to maximize the cumulative reward by the on-policy learning framework. In some embodiments, the on-policy learning framework includes a positive reward for the language model for determining the correct portions of the structured data, such as each relevant rows and/or each relevant columns, when the language model returns the relevant portions of the structured data in response to a query. In some embodiments, the on-policy learning framework includes a negative reward (e.g., a penalty) for determining incorrect portions of the structured data and/or failure to determine the correct portions of the structured data. For example, the on-policy learning framework can include a first negative reward for determining incorrect portions of the structured data, such as by returning irrelevant rows and/or columns in response to a query. The on-policy learning framework can include a second negative reward for failure to determine the correct portions of the structured data, such as failing to return the relevant rows and/or columns in response to a query. In some embodiments, the first negative reward for incorrect selection of rows and/or columns can be less of a penalty than the second negative reward for failure to select relevant rows and/or columns.

At block 408, the fine-tuned language model is output and stored. For example, the embeddings/parameters of the fine-tuned language model are output and stored.

Turning now to FIG. 5, a flow diagram is provided showing an embodiment of a method 500 for fine-tuning a language model to reduce representations of structured data, in accordance with embodiments described herein. Such reduced representation of the structured data generated by a fine-tuned language model can be used to efficiently and effectively reduce the input context of the structured data provided to an LLM.

Initially, at block 502, a training data set is prepared. For example, the training data set includes one or more tables, a set of questions (e.g., queries) for each of the tables, and portions of each of the tables that are relevant to each question of the set of questions corresponding to the relevant rows and/or columns of each table for the specific question.

At block 504, a pre-trained language model is accessed. For example, a pre-trained language model can be trained on a large and diverse dataset to learn general language patterns and contexts so that the language model can be utilized to generate output responses in response to input prompts.

At block 506, the pre-trained language model is fine-tuned, via a fine-tuning component, to maximize likelihood of determining relevant columns of a table in response to a query. For example, the fine-tuned language model for column reduction can be fine-tuned to generate an output representation of relevant columns based on a prompt with an instruction to select relevant columns, the input query, and a representation of the columns, such as list of column headers and/or data of the columns.

At block 508, the pre-trained language model is fine-tuned, via a fine-tuning component, to maximize likelihood of determining relevant rows of the table in response to a query. For example, the fine-tuned language model for row reduction can be fine-tuned to generate an output representation of relevant rows based on a prompt with an instruction to select relevant rows, the input query, and a representation of the remaining rows (e.g., after column reduction), such as list of row headers and/or data of the rows. In some embodiments, the fine-tuning of the language model to maximize likelihood of determining relevant columns of a table in response to a query and the fine-tuning of the language model to maximize likelihood of determining relevant rows of the table in response to a query is performed in parallel.

At block 510, the fine-tuned language model that is fine-tuned to maximize likelihood of determining relevant columns of a table in response to a query is further fine-tuned, via a reinforcement learning component, to maximize rewards of a policy to determine relevant columns of a table in response to a query. At block 512, the fine-tuned language model that is fine-tuned to maximize likelihood of determining relevant rows of a table in response to a query is further fine-tuned, via a reinforcement learning component, to maximize rewards of a policy to determine relevant rows of a table in response to a query. For example, each of the parameters for the initially fine-tuned language model for column reduction and the initially fine-tuned language model for row reduction are utilized as initial policy network parameters of an on-policy learning framework. In this regard, the fine-tuned language model(s) is further fine-tuned to maximize the cumulative reward by the on-policy learning framework. In some embodiments, the further fine-tuning of the fine-tuned language model to maximize rewards of a policy to determine relevant columns of a table in response to a query and the further fine-tuning of the fine-tuned language model to maximize rewards of a policy to determine relevant rows of a table in response to a query is performed in parallel.

At block 514, the fine-tuned language models are output and stored as a single fine-tuned language model. For example, the embeddings/parameters of the fine-tuned language models are output and stored.

Turning now to FIG. 6, a flow diagram is provided showing an embodiment of a method 600 for using a fine-tuned language model to reduce representations of structured data, in accordance with embodiments described herein. Such reduced representation of the structured data generated by a fine-tuned language model can be used to efficiently and effectively reduce the input context of the structured data provided to an LLM.

Initially, at block 602, a query from a user with structured data is received via a fine-tuned language model. In some embodiments, the structured data corresponds to an unseen table and the user provides a query (e.g., a question) to a language model based on the unseen table. In some embodiments, when the structured data of the input context is an unseen database (e.g., a relational database), the database, or a portion thereof, is converted to a table format in order for the fine-tuned language model(s) to reduce the input context by determining the relevant rows and/or columns of the table based on the query. In some embodiments, when the structured data of the input context is an unseen knowledge graph, the knowledge graph, or a portion thereof, is converted to a table format in order for the fine-tuned language model(s) to reduce the input context by determining the relevant rows and/or columns of the table based on the query.

At block 604, it is determined whether the structured data is greater than a threshold size (e.g., the amount of columns and/or rows of a table, the amount of data in the structured data file, and/or the like). For example, if the structured data is under a threshold size, the structured data may be sent directly to the pre-trained language model with the query to generate the response without reducing the input context. However, if the structured data is over a threshold size, the fine-tuned language model(s) reduces the input context for the pre-trained language model by determining the relevant portions of the structured data, such as relevant rows and/or columns of a table, based on the query.

In this regard, if the structured data is greater than the threshold size, at block 606, relevant portions of the structured data, such as the relevant rows and columns of the structured data, are determined via the fine-tuned language model. At block 608, a response to the query is generated based on applying the query and the relevant portions of the structured data to a language model. In some embodiments, the representation of the relevant portions of the structured data that is provided to the pre-trained language model to generate a response to the query is the relevant rows and columns of a table in table format. In some embodiments, the representation of the relevant portions of the structured data that is provided to the pre-trained language model to generate a response to the query is the relevant rows and columns of a table in string format. In some embodiments, the representation of the relevant portions of the structured data that is provided to the pre-trained language model to generate a response to the query is the relevant rows and columns of a table in natural language format. At block 612, the response is provided to the user in response to the query.

If the input context of the structured data is less than the threshold size, at block 610, a response to the query is generated based on applying the query and the entirety of the structured data to a language model and the response is provided to the user in response to the query at block 612.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
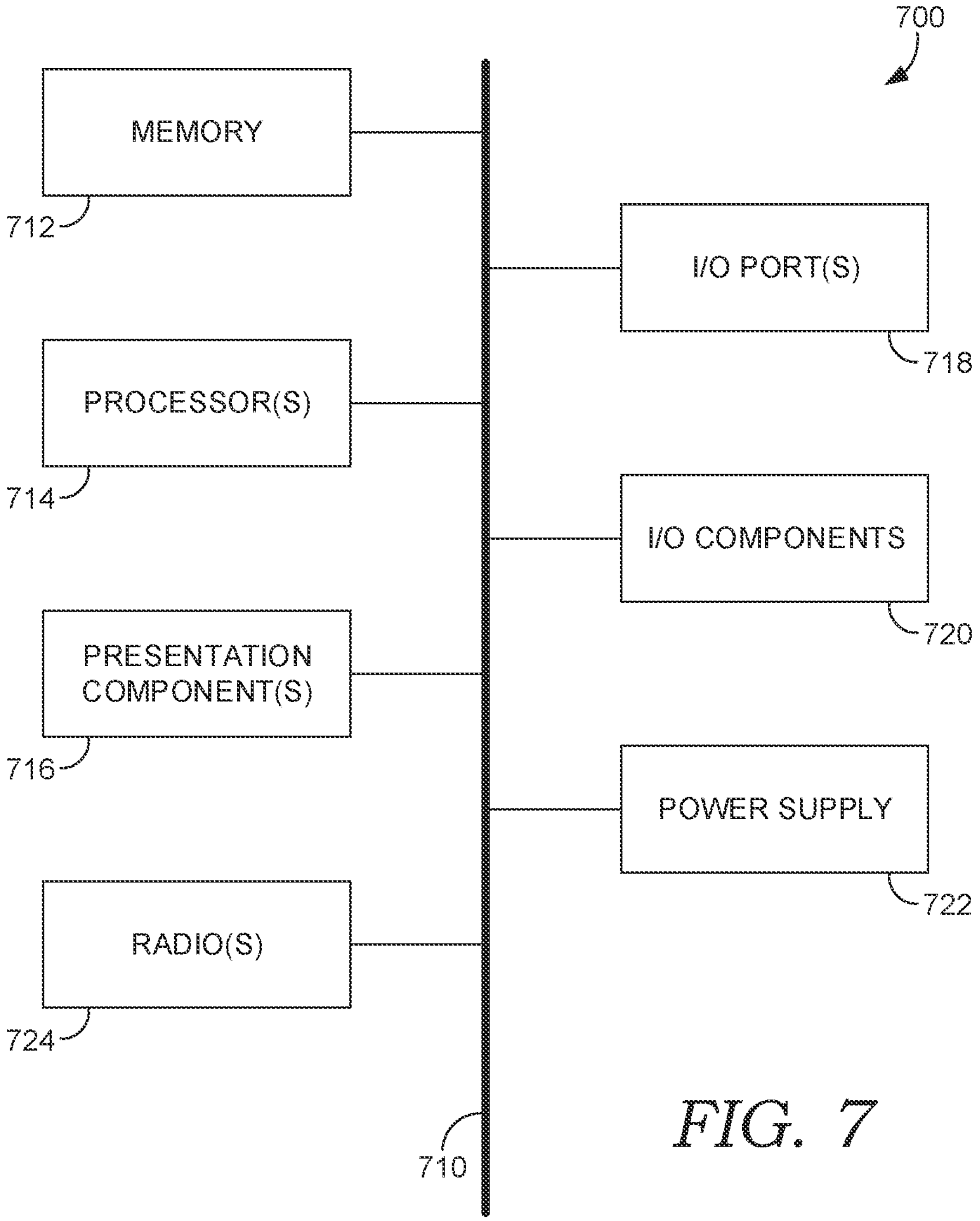
FIG. 7 is a block diagram of an example computing device in which embodiments of the present disclosure can be employed.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

The invention claimed is:

1. A non-transitory computer-readable medium storing executable instructions, which when executed by a processing device, cause the processing device to perform operations comprising:

accessing, by a fine-tuning component, training data, the training data comprising a table, a set of queries for the table, and each row and each column of the table that is relevant to each query of the set of queries;

fine-tuning, by an initial fine-tuning-component of the fine-tuning component, a first language model to maximize likelihood of determining each column of the table that is relevant based on each corresponding query of the set of queries to output a fine-tuned first language model and a second language model to maximize corresponding likelihood of determining each row of the table that is relevant based on each corresponding query of the set of queries to output a fine-tuned second language model;

applying reinforcement learning, by a reinforcement learning component of the fine-tuning component, to the fine-tuned first language model and the fine-tuned second language model to maximize a cumulative reward based on the training data, the cumulative reward comprising a reward for determining each correct row and each correct column of the table for each corresponding query of the set of queries, a first penalty for failing to determine each correct row and each correct column of the table for each query of the set of queries, and a second penalty for determining at least one of an incorrect row and an incorrect column of the table for each corresponding query of the set of queries, wherein applying the reinforcement learning to the fine-tuned first language model and the fine-tuned second language model further comprises:

using parameters of the fine-tuned first language model and the fine-tuned second language model as initial policy network parameters of an on-policy learning framework to maximize the cumulative reward based on the training data; and using proximal policy optimization to optimize policy updates to maximize the cumulative reward based on the training data; and outputting, by the fine-tuning component, the fine-tuned first language model and the fine-tuned second language model with the reinforcement learning applied.

2. The non-transitory computer-readable medium of claim 1, wherein the second penalty reduces the cumulative reward less than the first penalty.

3. The non-transitory computer-readable medium of claim 1, wherein applying the reinforcement learning to the fine-tuned first language model and the fine-tuned second language model further comprises:

using Kullback-Leibler divergence to dynamically adapt at least one of the reward, the first penalty and the second penalty at different points when applying the reinforcement learning to the fine-tuned first language model and the fine-tuned second language model.

4. The non-transitory computer-readable medium of claim 1, wherein applying the reinforcement learning to the fine-tuned first language model and the fine-tuned second language model further comprises:

fine-tuning the first language model to generate an output representation of relevant columns of the table; and fine-tuning the second language model to generate a corresponding output representation of relevant rows of the table.

5. The non-transitory computer-readable medium of claim 1, the operations further comprising:

generating the table by converting at least one of a knowledge graph and a database into the table.

6. The non-transitory computer-readable medium of claim 1, the operations further comprising:

receiving, by a model comprising the fine-tuned first language model and the fine-tuned second language model with the reinforcement learning applied, a user query and a corresponding table;

determining, by the model, each relevant row and each relevant column of the corresponding table based on the user query; and trigger-generating, based on applying the user query and a representation of each relevant row and each relevant column to a pre-trained language model, a response to the user query.

7. A computer-implemented method comprising:

accessing, by a fine-tuning component, training data, the training data comprising a table, a set of queries for the table, and each row and each column of the table that is relevant to each query of the set of queries;

fine-tuning, by an initial fine-tuning-component of the fine-tuning component, a first language model to maximize likelihood of determining each column of the table that is relevant based on each corresponding query of the set of queries to output a fine-tuned first language model and a second language model to maximize corresponding likelihood of determining each row of the table that is relevant based on each corresponding query of the set of queries to output a fine-tuned second language model;

applying reinforcement learning, by a reinforcement learning component of the fine-tuning component, to the fine-tuned first language model and the fine-tuned second language model to maximize a cumulative reward based on the training data, the cumulative reward comprising a reward for determining each correct row and each correct column of the table for each corresponding query of the set of queries, a first penalty for failing to determine each correct row and each correct column of the table for each query of the set of queries, and a second penalty for determining at least one of an incorrect row and an incorrect column of the table for each corresponding query of the set of queries, wherein applying the reinforcement learning to the fine-tuned first language model and the fine-tuned second language model further comprises:

using parameters of the fine-tuned first language model and the fine-tuned second language model as initial policy network parameters of an on-policy learning framework to maximize the cumulative reward based on the training data; and using proximal policy optimization to optimize policy updates to maximize the cumulative reward based on the training data; and outputting, by the fine-tuning component, the fine-tuned first language model and the fine-tuned second language model with the reinforcement learning applied.

8. The computer-implemented method of claim 7, wherein the second penalty reduces the cumulative reward less than the first penalty.

9. The computer-implemented method of claim 7, wherein applying the reinforcement learning to the fine-tuned first language model and the fine-tuned second language model further comprises:

using Kullback-Leibler divergence to dynamically adapt at least one of the reward, the first penalty and the second penalty at different points when applying the reinforcement learning to the fine-tuned first language model and the fine-tuned second language model.

10. The computer-implemented method of claim 7, wherein applying the reinforcement learning to the fine-tuned first language model and the fine-tuned second language model further comprises:

fine-tuning the first language model to generate an output representation of relevant columns of the table; and fine-tuning the second language model to generate a corresponding output representation of relevant rows of the table.

11. A computing system comprising:

a processor; and a non-transitory computer-readable medium having stored thereon instructions that when executed by the processor, cause the processor to perform operations including:

accessing, by a fine-tuning component, training data, the training data comprising a table, a set of queries for the table, and each row and each column of the table that is relevant to each query of the set of queries;

fine-tuning, by an initial fine-tuning-component of the fine-tuning component, a first language model to maximize likelihood of determining each column of the table that is relevant based on each corresponding query of the set of queries to output a fine-tuned first language model and a second language model to maximize corresponding likelihood of determining each row of the table that is relevant based on each corresponding query of the set of queries to output a fine-tuned second language model;

applying reinforcement learning, by a reinforcement learning component of the fine-tuning component, to the fine-tuned first language model and the fine-tuned second language model to maximize a cumulative reward based on the training data, the cumulative reward comprising a reward for determining each correct row and each correct column of the table for each corresponding query of the set of queries, a first penalty for failing to determine each correct row and each correct column of the table for each query of the set of queries, and a second penalty for determining at least one of an incorrect row and an incorrect column of the table for each corresponding query of the set of queries, wherein applying the reinforcement learning to the fine-tuned first language model and the fine-tuned second language model further comprises:

using parameters of the fine-tuned first language model and the fine-tuned second language model as initial policy network parameters of an on-policy learning framework to maximize the cumulative reward based on the training data; and using proximal policy optimization to optimize policy updates to maximize the cumulative reward based on the training data; and outputting, by the fine-tuning component, the fine-tuned first language model and the fine-tuned second language model with the reinforcement learning applied.

12. The computing system of claim 11, wherein the second penalty reduces the cumulative reward less than the first penalty.

13. The computing system of claim 11, wherein applying the reinforcement learning to the fine-tuned first language model and the fine-tuned second language model further comprises:

using Kullback-Leibler divergence to dynamically adapt at least one of the reward, the first penalty and the second penalty at different points when applying the reinforcement learning to the fine-tuned first language model and the fine-tuned second language model.

* * * * *